June 19, 1923.
R. J. AULTMAN
TRACTOR
Filed May 20, 1921
1,458,963
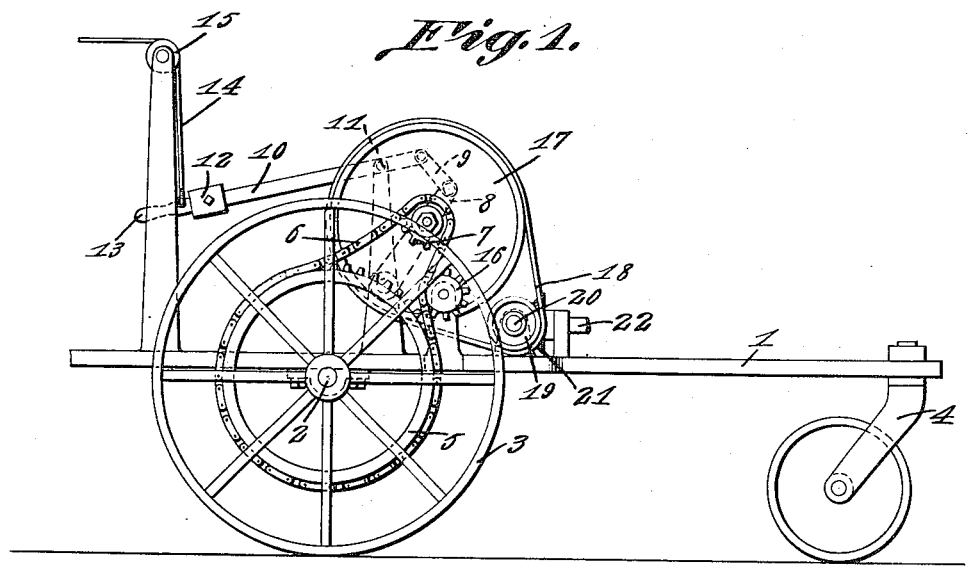
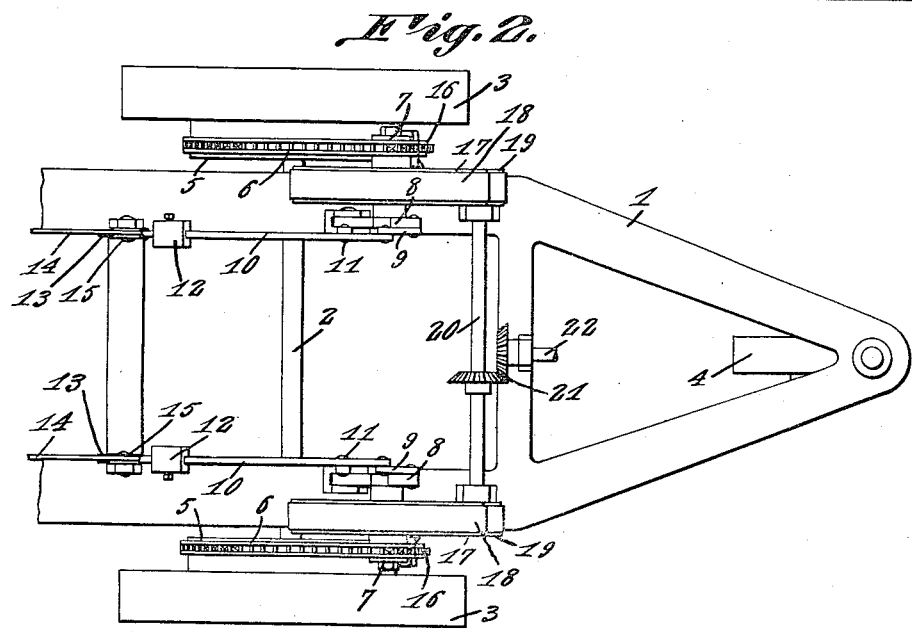
R. J. Aultman, Inventor Patented June 19, 1923.

1,458,963

UNITED STATES PATENT OFFICE.

RILEY J. AULTMAN, OF OVID, MICHIGAN.

TRACTOR.

Application filed May 20, 1921. Serial No. 471,219.

*To all whom it may concern:*

Be it known that I, RILEY J. AULTMAN, a citizen of the United States, residing at Ovid, in the county of Clinton and State of Michigan, have invented a new and useful Tractor, of which the following is a specification.

This invention relates to tractors, one of the objects being to provide means whereby through the use of reins the tractor can be steered and caused to move either backwardly or forwardly at the will of the driver who follows the same procedure as when driving a horse.

A further object is to provide simple and compact mechanism which can be shifted readily for the purpose of propelling the tractor in the direction desired, said mechanism being inexpensive and efficient.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Figure 1 is a side elevation of the tractor, parts being broken away and the structure being illustrated more or less in diagram.

Figure 2 is a plan view of the parts shown in Figure 1.

Referring to the figures by characters of reference 1 designates a portion of the frame of the tractor, the same being provided with an axle 2 on which supporting wheels 3 are mounted to rotate freely. A caster 4 supports one end portion of the frame 1.

Each of the wheels 3 has a sprocket 5 adapted to rotate therewith and engaging the sprocket is an endless chain 6 adapted to be driven by a sprocket 7 carried by a lever 8 which is mounted to swing relative to the frame 1 and is supported in any suitable manner. A link 9 connects the free end of this lever to one end of an operating lever 10 which is fulcrumed between its ends as shown at 11 and carries a weight 12 preferably adjustable thereon. This lever 10 has a handle 13 whereby it can be shifted by hand when the operator is positioned close to the lever. Controlling reins 14 are connected at their ends to the levers 10 at the respective sides of the machine, these reins being supported on guide sheaves 15 which can be mounted in any suitable manner adjacent the sides of the machine.

The two chains 6 are in engagement with idler sprockets 16 located between the sprockets 5 and 7. A belt wheel 17 rotates with each sprocket 7 and also shifts therewith when lever 8 is moved. A belt 18 is mounted on each of the wheels 17 and engages a pulley 19. One of these pulleys is provided for each wheel 17 and the two pulleys are secured to the ends of a transverse shaft 20 adapted to be driven, through meshing gears 21 or in any other suitable manner, from the shaft 22 of a motor, not shown.

Under normal conditions the weights 12 hold the hand levers 10 in their lowermost positions so that they pull through the links 9 upon the levers 8 and thus hold the chains 6 taut. Consequently power will be transmitted from pulleys 19 through the taut belts 18 to the wheels 17 and thence through the chain and sprockets to the supporting wheels 3. Should it be desired to turn the tractor toward the right, the driver pulls on the right side of the reins 14. This will result in the right hand lever 10 being lifted so that it will thrust through links 9 against the right hand lever 8. Wheel 17 will thus be moved into contact with its pulley 19 and at the same time the belt 18 will be loosened so as to slip. Thus the pulley 19 and the wheel 18 become friction gears whereby the right hand wheel is rotated backwardly while the left hand wheel continues to rotate forwardly. As the result the vehicle is given an abrupt right hand turn. By only pulling slightly on the right hand lever 10 so as merely to slacken the belt 18 without bringing the wheel 17 into contact with the pulley 19, the left hand supporting wheel 3 becomes the sole driving member while the right hand supporting wheel remains uncoupled from the motor. Thus the tractor will turn gradually to the right. By pulling slightly or strongly upon the left side of the reins 14 the vehicle will be turned either gradually or abruptly to the left, as will be obvious. By pulling lightly on both sides of the reins the two belts 18 will be slackened so that neither of the wheels 3 will be driven. By pulling hard on both sides of the reins both of the wheels 17 will be brought into contact with the pulleys 19 so that the rotation of both wheels 3 will be reversed and the tractor caused to move rearwardly. By providing the idler sprockets 16 the chains 6 are prevented from getting too slack when the levers 8 are swung in one direction.

From the foregoing it will be obvious that the direction of movement of the tractor can be controlled by the manipulation of reins in the same way as when used in driving a horse.

What is claimed is:—

1. In a tractor the combination with independently rotatable supporting wheels, of separate drive pulleys, separate belt wheels, power transmitting connections between the belt wheels and the respective supporting wheels, belts for transmitting motion from the pulleys to the respective belt wheels, and means for shifting the belt wheels separately or simultaneously to loosen the belts and to bring the belt wheels into frictional driving contact with the respective pulleys, and yielding means for holding the belts normally taut.

2. The combination with supporting wheels, of belt wheels adjacent the respective supporting wheels, means for transmitting motion from the belt wheels to the respective supporting wheels, separate drive pulleys, belt connections between the pulleys and the respective belt wheels, controlling levers, means operated by each lever for shifting one of the belt wheels to loosen its belt and to position said wheel in frictional driving engagement with the pulley of said belt, a steering rein connected at its ends to the respective levers, and adjustable weights upon the levers for holding the belts normally taut.

In testimony that I claim the foregoing as my own, I have hereto affixed my signature in the presence of two witnesses.

RILEY J. AULTMAN.

Witnesses:
B. V. SOULE,
M. C. CAMPBELL.